US009234453B2

(12) United States Patent
Atz et al.

(10) Patent No.: US 9,234,453 B2
(45) Date of Patent: Jan. 12, 2016

(54) INTEGRATED THERMOSTATIC VALVE AND CHARGE AIR COOLER COVER ASSEMBLY

(71) Applicant: General Electric Company, Schenectady, NY (US)

(72) Inventors: Charles Atz, Grove City, PA (US); Pranav Raina, Bangalore (IN); Nitin Kumar N, Bangalore (IN); Surendra Panwar, Bangalore (IN); Anand Gosbal, Bangalore (IN)

(73) Assignee: General Electric Company, Schenectady, NY (US)

( * ) Notice: Subject to any disclaimer, the term of this patent is extended or adjusted under 35 U.S.C. 154(b) by 8 days.

(21) Appl. No.: 14/191,631

(22) Filed: Feb. 27, 2014

(65) Prior Publication Data
US 2015/0240703 A1 Aug. 27, 2015

(51) Int. Cl.
| F02B 33/10 | (2006.01) |
| F02B 47/08 | (2006.01) |
| B60T 11/28 | (2006.01) |
| F16D 65/74 | (2006.01) |
| F15B 15/18 | (2006.01) |
| B60T 7/02 | (2006.01) |

(Continued)

(52) U.S. Cl.
CPC ............ F02B 29/0475 (2013.01); F01P 3/20 (2013.01); F02B 29/0493 (2013.01); *F01P 2050/02* (2013.01); *F01P 2060/02* (2013.01); *F02B 29/0412* (2013.01); *F02B 29/0418* (2013.01); *F02B 29/0437* (2013.01); *F02B 29/0462* (2013.01); *F02M 25/0731* (2013.01); *F02M 25/0734* (2013.01); *F02M 35/116* (2013.01)

(58) Field of Classification Search
CPC ............ F02M 35/116; F02M 25/0731; F02M 25/0734; F02B 29/0462; F02B 29/0431; F02B 29/0418; F02B 29/0437; F02B 29/0412; F02B 29/0443; F02B 29/0475; F02B 29/0493; F01P 2060/02
USPC ............... 123/542, 562, 563, 568.11, 568.12, 123/568.15; 60/590–594, 605.2; 165/157–159, 162, 165, 169, 173, 165/175–176
See application file for complete search history.

(56) References Cited

U.S. PATENT DOCUMENTS

| 5,018,664 A | 5/1991 | Butler |
| 5,392,604 A | 2/1995 | Nikula et al. |
| 2012/0018127 A1* | 1/2012 | Iwasaki .................... 165/104.14 |

FOREIGN PATENT DOCUMENTS

| DE | 19907267 A1 | 8/2000 |
| DE | 102013206089 A1 | 10/2013 |

OTHER PUBLICATIONS

A European Search Report and Opinion issued in connection with corresponding EP Application No. 15156687.4 on Jul. 6, 2015.

Primary Examiner — Lindsay Low
Assistant Examiner — Charles Brauch
(74) Attorney, Agent, or Firm — GE Global Patent Operation; John A. Kramer

(57) ABSTRACT

A cover for a charge air cooler of a turbocharged engine. The cover body defines a cooling water plenum, which has an opening at a first side of the cover for attachment over a water outlet of the charge air cooler. A plurality of valve housings are formed integrally with the body of the cover at a second side of the cover opposite the cooling water plenum opening. Each valve housing has a peripheral wall that extends from the cover to define an inner chamber, which opens into an inner fluid passage formed in the cover.

22 Claims, 6 Drawing Sheets

(51) Int. Cl.
*F02B 33/44* (2006.01)
*F28D 7/10* (2006.01)
*F28F 9/02* (2006.01)
*F28D 7/00* (2006.01)
*F28D 7/02* (2006.01)
*F28F 3/12* (2006.01)
*F28D 7/06* (2006.01)
*F02B 29/04* (2006.01)
*F01P 3/20* (2006.01)
*F02M 35/116* (2006.01)
*F02M 25/07* (2006.01)

INTEGRATED THERMOSTATIC VALVE AND CHARGE AIR COOLER COVER ASSEMBLY

BACKGROUND

1. Technical Field

Embodiments of the invention relate generally to thermal engines, such as diesel engines. Particular embodiments relate to fluid heat exchange systems for turbocharged or supercharged diesel engines.

2. Discussion of Art

Diesel engines are used in various transportation applications, for example, in propulsion of marine vessels. Often, such engines use turbochargers or superchargers to scavenge exhaust gas pressure for pressurizing ("charging") intake air. Typically, engines that use chargers also include a charge air cooler for reducing the temperature of the pressurized air before it is introduced into the combustion cylinders. The charge air coolers typically house water coils; the high temperature charge air flows across fins mounted to those water coils, while the water through those coils flows to a fin-tube heat exchanger cooled by water. Additionally, diesel engines typically are cooled directly by water flowing through internal passages, and indirectly by lubricating oil that coats and flows between moving parts.

Commonly, each cooling system (charge air cooler, cooling water, and oil cooling) has its own set of piping and valves. Packaging all this piping into a smallest feasible volume produces a tangle of metal parts that presents challenges for assembly, inspection, and maintenance of key components such as thermostat valves, pumps, sensors etc.

For example, each cooling system comprises a thermostat mixing or diverging valve, which regulates temperature at the hot side of the coolant loop by adjusting the proportion of coolant that flows through or bypasses the cool side of the loop. Usually, the thermostat valves and other components are accessible for inspection or maintenance only by removing a substantial mass of piping.

An additional characteristic of the typical tangle of coolant and lubricant piping is that certain components or joints within this tangle are relatively flexible and, therefore, have relatively low natural frequencies which are less than engine running frequency, leading to resonance or excessive vibrations. Thus, at typical engine running speeds, excitation of a single component or joint can lead to adverse vibration of the entire piping system.

BRIEF DESCRIPTION

In view of the above, it would be advantageous to provide an engine with a cooling system in which the various thermostat valves are easily accessible. Also, it would be advantageous to provide an engine with a cooling system having enhanced stiffness and higher natural frequencies such that typical engine running speeds do not excite adverse vibration.

In embodiments, a cover is provided for a charge air cooler of a turbocharged engine. The cover comprises a body that defines a cooling water plenum, which has an opening at a first side of the cover for attachment over a water outlet of the charge air cooler. The cover also comprises a plurality of valve housings formed integrally with the body of the cover at a second side of the cover opposite the cooling water plenum opening. Each valve housing has a peripheral wall that extends from the cover to define an inner chamber, which opens into an inner fluid passage formed in the cover.

In other embodiments, a thermostat valve is installed in a charge air cooler cover. The thermostat valve comprises a bottom plate fastened into an inner chamber of a valve housing formed in the charge air cooler cover and partitioning the inner chamber of the valve housing from an inner fluid passage formed through the cooler cover, the bottom plate including a flow hole. The thermostat valve also comprises a thermostrictive element fixedly attached to the bottom plate at or adjacent the flow hole, with a first end of the thermostrictive element protruding from the bottom plate into the inner fluid passage and with a second end of the thermostrictive element projecting from the bottom plate into the inner chamber of the valve housing. The thermostat valve also comprises an intermediate plate fastened to an inward shoulder of the valve housing and partitioning the inner chamber of the valve housing from an outer chamber of the valve housing, and including an orifice aligned with the flow hole of the bottom plate; a sleeve positioned sealingly through the orifice of the intermediate plate, and supported on the second end of the thermostrictive element for movement with reference to the bottom plate; a bonnet plate sealing fastened to an outward surface of the valve housing and sealing the outer chamber of the valve housing; and a stopper projecting from the bonnet plate toward the bottom plate in alignment with the orifice of the intermediate plate.

In other embodiments, a mixing valve is assembled into a charge air cooler cover. The mixing valve comprises a bottom plate fastened into an inner chamber of a valve housing integrally formed in the body of the cooler cover, and partitioning the inner chamber of the valve housing from an inner fluid passage formed in the cooler cover, the bottom plate including a flow hole. The mixing valve also comprises an intermediate plate fastened into the valve housing and partitioning the inner chamber of the valve housing from an outer chamber of the valve housing, and including an orifice aligned with the flow hole of the bottom plate; a bonnet plate fastened at an outward surface of the valve housing and sealing the outer chamber of the valve housing; a stopper projecting from the bonnet plate toward the bottom plate in alignment with the orifice of the intermediate plate; and a sleeve supported for movement sealingly through the orifice of the intermediate plate between first, second, and third conditions of the sleeve. Under the first condition an inward end of the sleeve contacts the bottom plate sealingly around the flow hole, while an outward end of the sleeve is spaced apart from the stopper, such that fluid can pass among the inner fluid passage and the outer chamber via the sleeve, under the second condition the inward end of the sleeve is spaced apart from the bottom plate and the outward end of the sleeve is spaced apart from the stopper, such that fluid can pass among the inner fluid, the inner chamber, and the outer chamber via the sleeve, and under the third condition the inward end of the sleeve is spaced apart from the bottom plate and the outward end of the sleeve contacts the stopper, such that fluid can pass among the inner fluid passage and the inner chamber via the sleeve and is stopped from passing to or from the outer chamber.

DRAWINGS

The present invention will be better understood from reading the following description of non-limiting embodiments, with reference to the attached drawings, wherein below:

DETAILED DESCRIPTION

Figure 1:
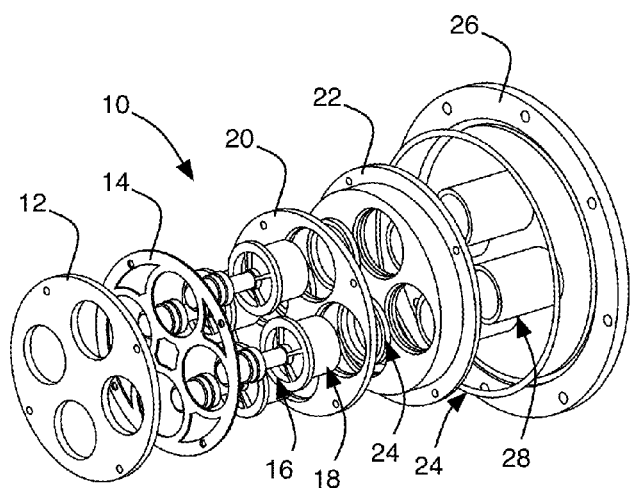
FIG. 1 illustrates in perspective view components of a thermostat valve.

Reference will be made below in detail to exemplary embodiments of the invention, examples of which are illustrated in the accompanying drawings. Wherever possible, the same reference characters used throughout the drawings refer to the same or like parts, without duplicative description. Although exemplary embodiments of the present invention are described with respect to temperature-controlled mixing valves having integrated thermostrictive elements, embodiments of the invention also are applicable for use with three-way valves, generally.

Aspects of the invention relate to forming a three-way valve housing within a larger structure, thereby integrating the valve components into a more rugged assembly. In addition to enhancing durability, other advantages of the invention include enhanced ease of access for inspection, maintenance, or repair. Additionally, the valve housing is formed in such a way that internal components can be substituted or replaced by other components to provide differing valve functionality and flow capabilities, without restructuring the valve housing. In particular, the valve housing is provided with internal attachment surfaces for partitions and support plates permitting modular substitution of moving parts.

As used herein, the terms "substantially," "generally," and "about" indicate conditions within reasonably achievable manufacturing and assembly tolerances, relative to ideal desired conditions suitable for achieving the functional purpose of a component or assembly.

FIG. 1 shows a thermostat mixing valve 10, which comprises a bottom plate 12, a gasket 14, several thermostrictive elements 16 and associated sleeves 18, a cover plate 20 (which captures the gasket 14 and the thermostrictive elements 16 to the bottom plate 12), an intermediate plate 22, seals 24, a bonnet plate 26, and stoppers 28. In an exemplary embodiment of the invention, the thermostat valve is assembled into a valve housing that is integrally formed in a charge air cooler cover, as further discussed below with reference to FIGS. 3 and 4

Figure 2:
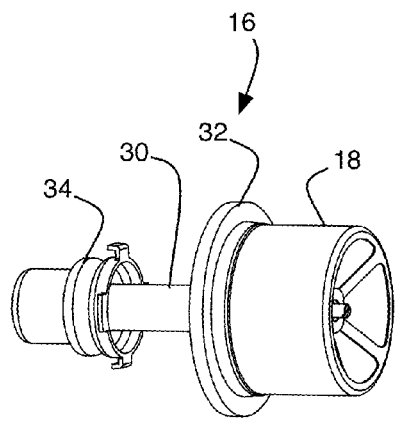
FIG. 2 illustrates in perspective view a thermostat element of the valve shown in FIG. 1.

Referring to FIG. 2, each thermostrictive element 16 comprises a shaft 30 and a flange 32. The shaft 30 carries, at its left end, a spring stopper 34; and, at its right end, the sleeve 18. In operation, the spring stopper 34 restrains a spring (not shown) that pushes the spring stopper away from the flange 32. Rising temperature causes the shaft 30 to expand lengthwise, thereby carrying the sleeve 18 away from the flange 32.

Figure 3:
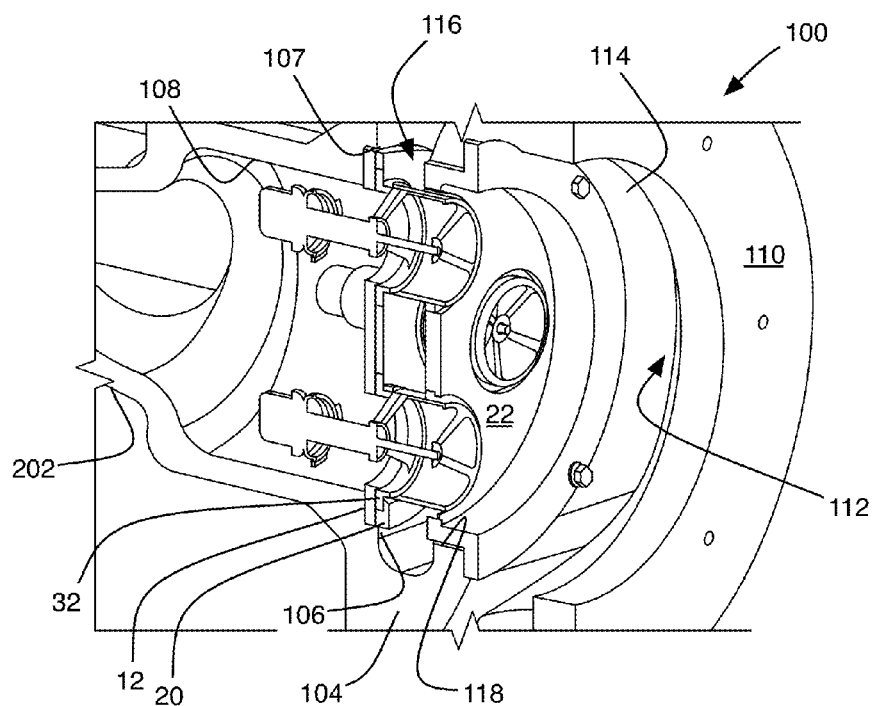
FIG. 3 illustrates in cutaway perspective view a thermostat valve assembled into a valve housing chamber of a charge air cooler cover.
Figure 4:
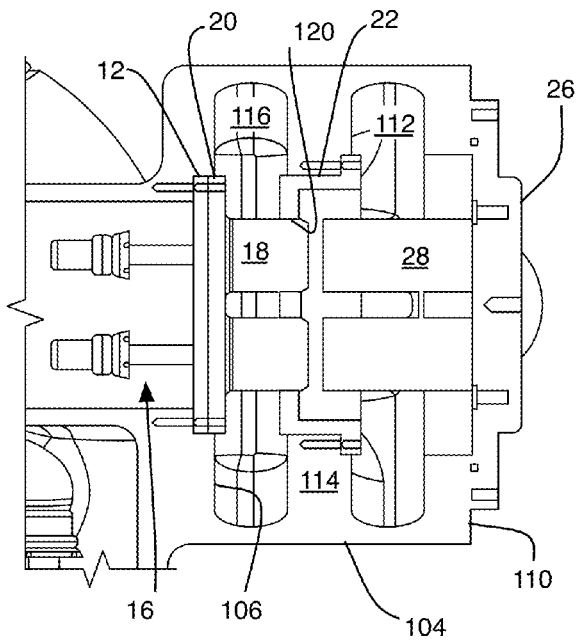
FIG. 4 illustrates in side sectional view the thermostat valve and valve housing chamber shown in FIG. 3.

FIGS. 3 and 4, respectively, show the thermostat valve 10 partly and fully assembled into a valve housing 100, according to an embodiment of the invention. The valve housing 100 is formed as an integral part of a body 202 of a charge air cooler cover (not fully shown in these views), and comprises a peripheral wall 104 that protrudes from an internal surface 106, adjacent an opening 107 of an inner fluid passage 108 formed through the wall 102, to an outward end 110 that surrounds a outer chamber 112, the outward end of the peripheral wall being adapted for attachment of the bonnet plate 26. The peripheral wall 104 comprises an inward shoulder 114 formed at its inward surface to partition the outer chamber 112 from an inner chamber 116 adjacent the opening into the inner fluid passage 108. The shoulder 114 defines a window 118 between the inner chamber 116 and the outer chamber 112. A sectional area of the outer chamber 112 is larger than a sectional area of the window 118, and the sectional area of the window 118 is larger than a sectional area of the opening 107 into the inner fluid passage 108, such that the bottom plate 12 can be inserted through the outer chamber 112 and the window 118 for attachment at the opening 107, while the intermediate plate 22 can be inserted through the outer chamber 112 for attachment at the window 118. The sleeves 18 then fit through holes 120 formed in the intermediate plate 22.

The cover plate 20 captures the flanges 32 against the bottom plate 14. Thus, when the thermostrictive elements 16 are in their fully-contracted condition, the sleeves 18 rest against the flanges 32 and extend through the intermediate plate 22, so that flow is possible only between the inner fluid passage 108 and the outer chamber 112; the inner chamber 116 is cut off from flow. As the thermostrictive elements 16 expand, flow is increasingly permitted among the inner passage 108 and the inner chamber 116. When the thermostrictive elements 16 are fully-expanded, the sleeves 18 abut against the stoppers 28; flow is blocked between the outer chamber 112 and the inner passage 108, while flow between the inner passage 108 and the inner chamber 116 is at a maximum. Thus, the valve 10 acts as a temperature-responsive proportioning valve for flows among the three fluid volumes bounded by the valve housing 100, according to fluid temperature in the inner passage 108.

FIGS. 5 through 7 and 10 better illustrate the charge air cooler cover 200, in which three valve housings 100a, 100b, 100c are formed. (Each valve housing 100a, 100b, 100c is configured like the valve housing 100 illustrated in FIGS. 3 and 4. Also, generally, each valve housing may receive a respective valve 10a, 10b, 10c as shown in FIGS. 1-4.) The cover 200 has a body 202, which encloses a cooling water plenum 204. At a first side of the cover, the cooling water plenum 204 has a flanged opening 206 for connection over a water outlet of a charge air cooler 1008 (shown in FIG. 10). The cooling water plenum 204 is divided into three volumes 204a (for receiving high temperature water from the engine coolant channels via water passages of the charge air cooler adjacent a charge air inlet), 204b (for receiving moderate temperature water from water passages of the charge air cooler intermediate between the charge air inlet and a charge air outlet), and 204c (for delivering low temperature water into water passages of the charge air cooler distal from the charge air inlet and adjacent the charge air outlet). Opposite the opening 206, a back portion 208 of the cover body 202 comprises the three valve housings 100a, 100b, and 100c. The first and second valve housings 100a, 100b open away from the cooling water plenum opening 206. The third valve housing 100c opens orthogonal to the cooling water plenum opening 206. The first and third valve housings 100a, 100c have no direct fluid connection to the cooling water plenum 204. The second valve housing 100b is fluidly connected with volume 204a by its inner passage 108b.

Figure 5:
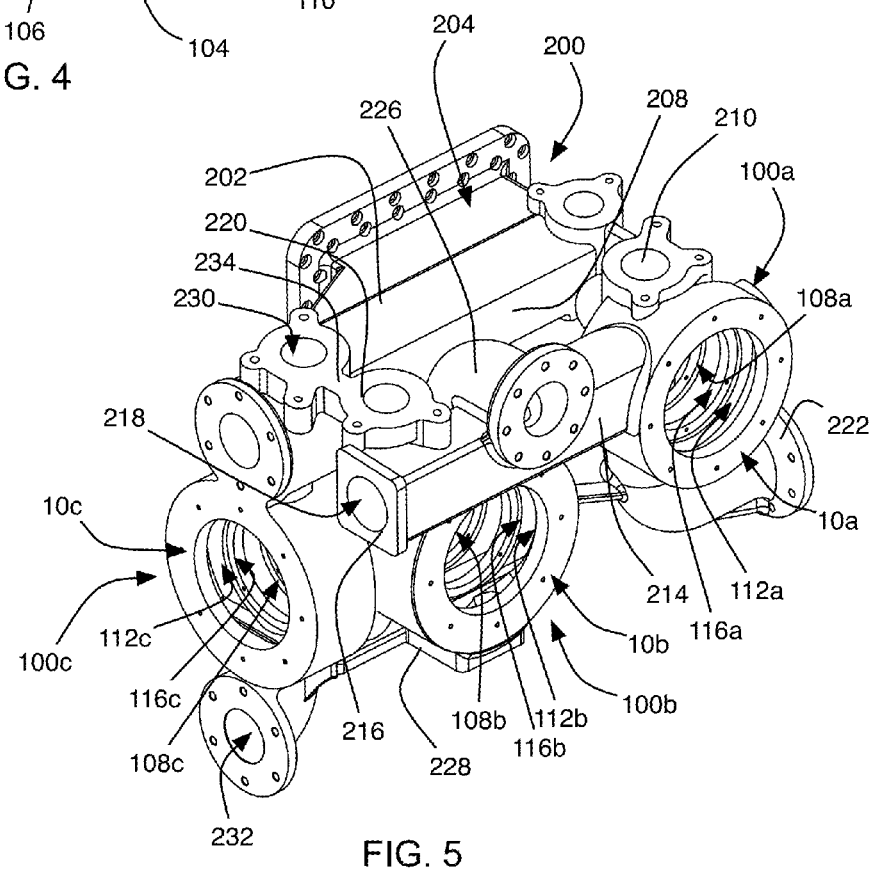
FIG. 5 illustrates in perspective view an outward side of a charge air cooler cover including three valve housing chambers substantially as shown in FIGS. 3 and 4.
Figure 7:
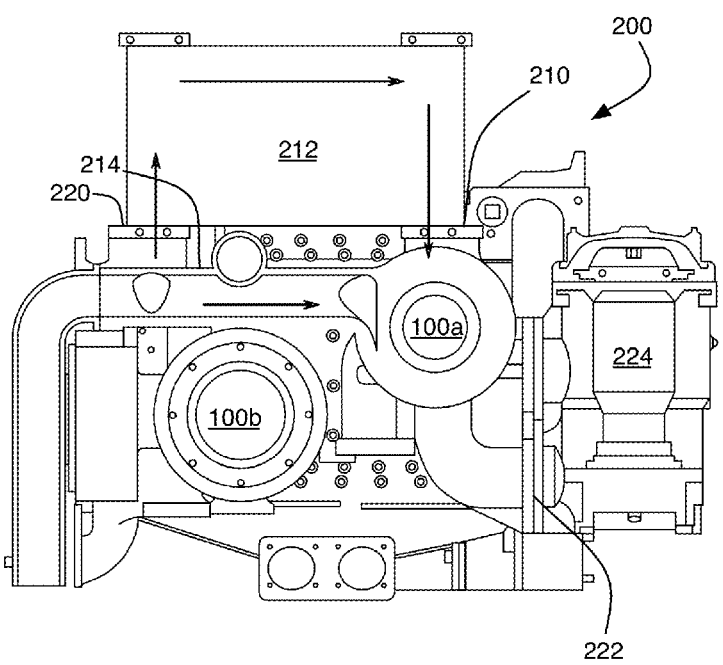
FIG. 7 illustrates in sectional view a stiffener and valve housings of the charge air cooler cover shown in FIGS. 5 and 6.
Figure 10:
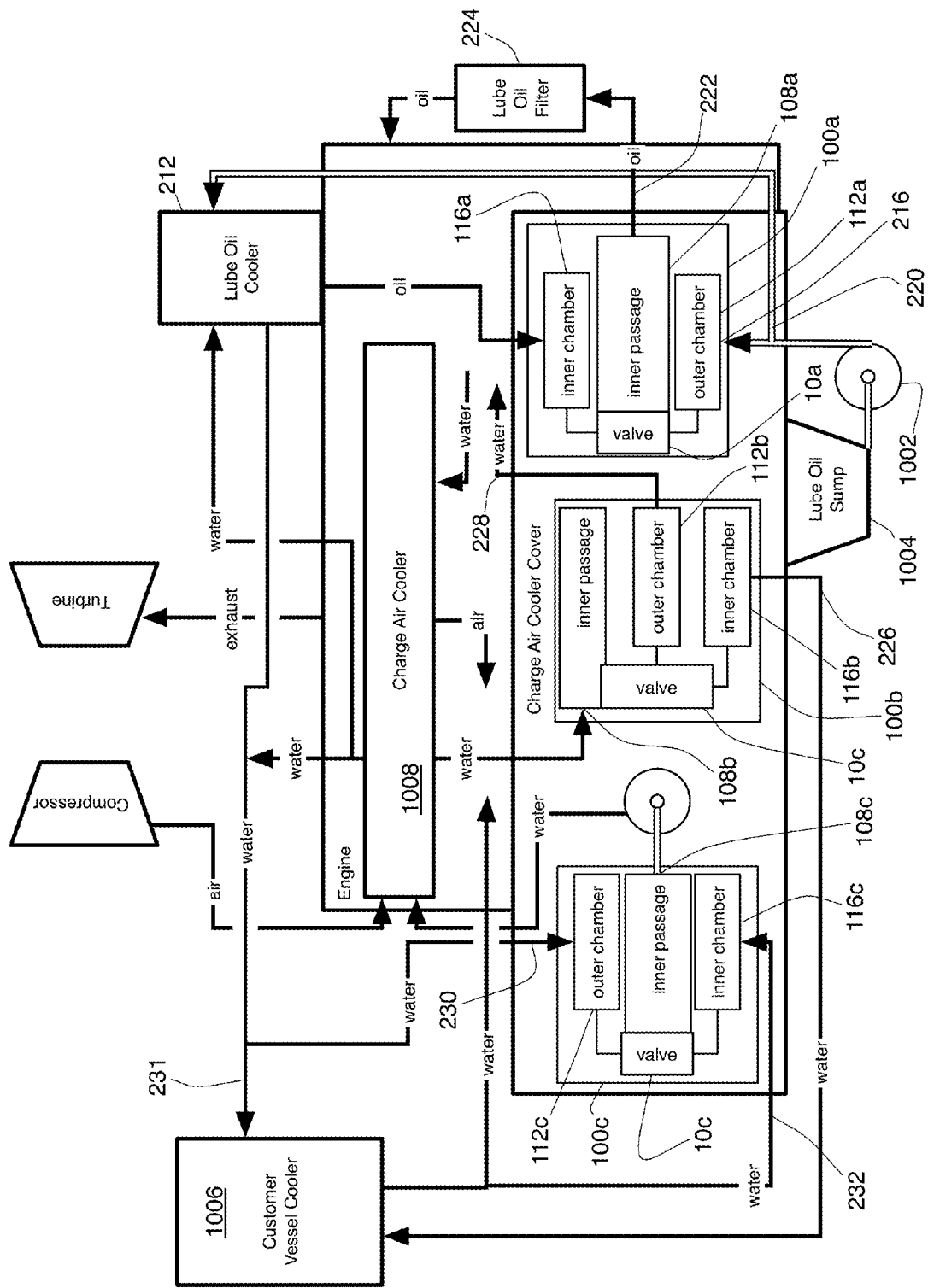
FIG. 10 is a schematic flow diagram of an embodiment of the invention.

FIGS. 5, 7, and 10 show in perspective and schematic views the first valve housing 100a, which is configured as a thermostat mixing valve for lube oil that is pumped by a pump 1002 from an engine sump 1004. The first valve housing 100a has a first inlet 210, at the top of the charge air cooler cover 200, which is provided for admitting lube oil from a lube oil cooler 212 outlet into the inner chamber 116a of the first valve housing 100a, as shown in FIG. 7. From the left side of the first valve housing 100a, a pipe 214 extends across the charge air cooler cover to a second inlet 216. As shown in FIG. 10, piping external to the inventive charge air cooler cover 200 connects the second inlet 216 with a discharge nozzle of the lube oil pump 1002. Referring also to FIG. 5, the pipe 214 encloses a fluid passage 218, which conveys high temperature lube oil from the second inlet 216 to the outer chamber 112a of the valve housing 100a. At an upper side of the pipe 214, near the second valve housing 100b, there is a flanged opening 220 for fluid connection of the fluid passage 218 to the lube oil cooler 212 inlet. At a lower side of the first valve housing 100a, a nozzle 222 is provided for connection of the inner fluid passage 108a to a lube oil filter 224 inlet. Thus, operation of the valve 10a within the first valve housing 100a proportions flow of the lube oil from the pump 1002 either directly through the valve housing 100a to a lube oil filter 224, or first through the lube oil cooler 212 before reaching the valve housing 100a.

For example, in operation, lube oil flows into the second inlet 216, then either through the flanged opening 220 into the lube oil cooler 212 and thence to the inner chamber 116a, or directly through the fluid passage 218 to the outer chamber 112a of the first valve housing 100a. Positioning of the valve 10a within the valve housing 100a, which is determined by temperature of lube oil surrounding the thermostrictive elements within the inner passage 108a, thereby proportions respective flows of cooled lube oil from the lube oil cooler 212 through the inner chamber 116a and into the inner passage 108a, or of hot lube oil direct from the fluid passage 218 through the outer chamber 112a and into the inner passage 108a. Thus, the valve 10a acts as a thermostat mixing valve installed into the valve housing 100a, so that an increase of lube oil temperature at the second inlet 216 tends to cause expansion of the valve thermostat element, which tends to reduce flow from the fluid passage 218 through the valve housing 100a to the nozzle 222, and to increase flow from the lube oil cooler 212 through the valve housing 100a to the nozzle 222. Accordingly, the valve 10a within the valve housing 100a, formed integrally in the charge air cooler cover 200, acts together with the lube oil cooler 212 mounted on the charge air cooler cover as a thermostat valve to maintain substantially steady temperature of the oil entering the lube oil filter 224 from the inner passage 108a.

Typically, lube oil coolers and oil mixing valves have been designed and manufactured in a separate functional grouping from the water passages and valves associated with charge air cooler covers; however, according to one aspect of the present invention, the lube oil cooler connections and lube oil thermostat valve 100a are integrated into the inventive charge air cooler cover 200.

Still referring to FIG. 7, the pipe 214 is integrally attached with the second valve housing 100b, where the pipe 214 forms part of a wall of an outlet nozzle 226 that is fluidly connected with the inner chamber 116b of the second valve housing 100b. The pipe 214 thereby stiffens the overall structure of the charge air cooler cover 200, in particular, causing the valve housings 100a, 100b to vibrate together with the charge air cooler cover body 202 at a higher first natural frequency than the first natural frequency of either housing separately.

Referring again to FIGS. 5 and 10, the second valve housing 100b is configured as a thermostat mixing valve for high temperature water returning from the engine coolant passages via the charge air cooler. The second valve housing 100b comprises the outlet nozzle 226 that is fluidly connected with the inner chamber 116b, as well as a lower discharge 228 that is fluidly connected with the outer chamber 112b. The inner passage 108b penetrates the body 202 of the charge air cooler cover 200 to connect with the first volume 204a of the cooling water plenum 204, which receives high temperature water from the engine coolant passages via a first grouping of coolant channels adjacent the air intake of the charge air cooler. In use, the outlet nozzle 226 is fluidly connected with a customer-supplied cooler vessel 1006 (e.g. a fin-tube air cooled radiator, a double-tube seawater heat exchanger, or the like), whereas the lower discharge 228 is fluidly connected back to the engine coolant passages, for example, via a pump (not shown). From the cooler vessel 1006, the cooled water also flows back to the engine coolant passages. Thus, depending on the temperature of the water arriving at the inner passage 108b, the second valve 10b acts as a thermostat mixing valve to proportion flows of cooled water and uncooled water, thereby maintaining a steady temperature of the water flowing through the plenum 204.

The third valve housing 100c is configured as a thermostat mixing valve for moderate temperature water returning from the charge air cooler and from the lube oil cooler. The third valve housing 100c comprises an outer chamber 112c, an inner chamber 116c, and an inner passage 108c. The third valve housing 100c also comprises an upper nozzle 230, opening into the outer chamber 112c; a bypass nozzle 231, which fluidly attaches the upper nozzle to an inlet of the customer vessel cooler 1006 via external piping; and a lower nozzle 232, opening into the inner chamber 116c and fluidly attached via external piping to an outlet of the customer vessel cooler 1006. The upper nozzle 230 is joined by a bridge 234 to the outlet nozzle 226 of the second valve housing 100b. In operation, the upper nozzle 230 receives return cooling water at moderate temperature from the lube oil cooler 212 and from the charge air cooler 1008 and delivers the cooling water to the outer chamber 112c. The bypass nozzle 231 passes to the customer vessel cooler 1006 whatever portion of the return cooling water is not permitted to flow into the outer chamber 112c. The lower nozzle 232 receives from the customer vessel cooler 1006 the return cooling water that bypassed the outer chamber 112c. Depending on the temperature of the cooling water within the inner passage 108c, flow is proportioned to the inner passage from the outer chamber 112c (so that water returns directly to the lube oil cooler 212 and to the charge air cooler 1008, bypassing the customer vessel cooler 1006) or from the inner chamber 116c (so that water flows from the bypass nozzle 231 through the customer vessel cooler 1006 and back into the a lower nozzle 232). Particularly, as temperature rises within the inner passage 108c, more of the water is proportioned from the outer chamber 112c through the inner chamber 116c to the customer vessel cooler 1006. From the customer vessel cooler 1006, the cooling water returns to the lube oil cooler 212 and to the charge air cooler 1008.

Figure 6:
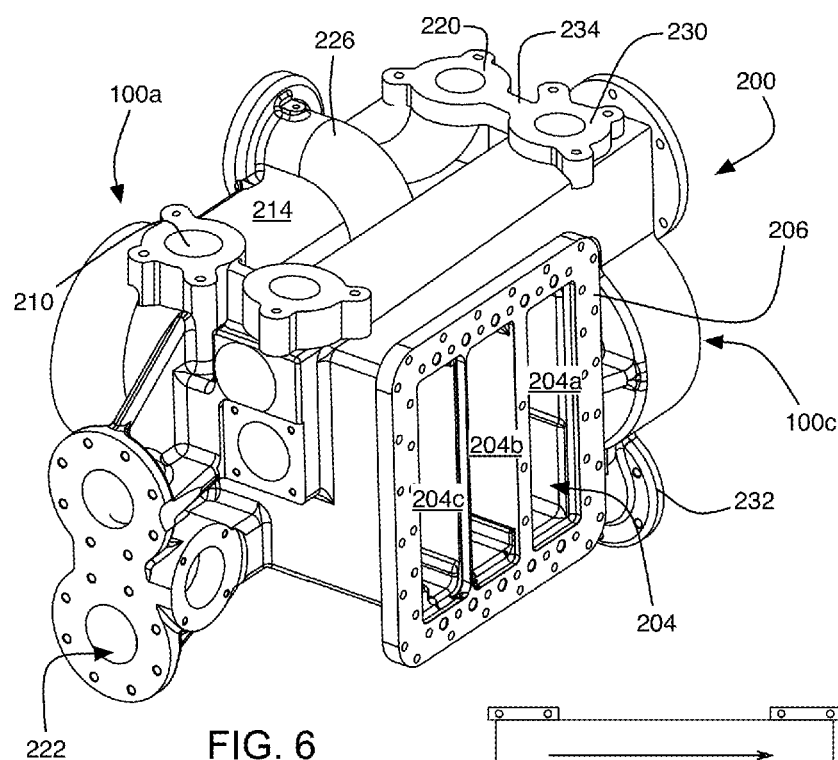
FIG. 6 illustrates in perspective view an inward side of the charge air cooler cover shown in FIG. 5.

Although FIGS. 5, 6, and 10 show embodiments wherein three valves are provided (one for lube oil, another for high temperature cooling water (average temperature above about 80 C.), and a third for low temperature cooling water (average temperature <50 C.), it is possible to accomplish benefits of the invention in embodiments of only two valves, or of more than three valves. For example, in embodiments, a first valve housing may be provided for lube oil and a second valve housing may be provided for moderate temperature water, with high temperature water by default returning to a customer vessel cooler. Alternatively, a first valve housing may be provided for lube oil while a second valve housing is provided, in parallel with a cooler vessel, for mixing and bypassing moderate temperature and high temperature water.

Figure 8:
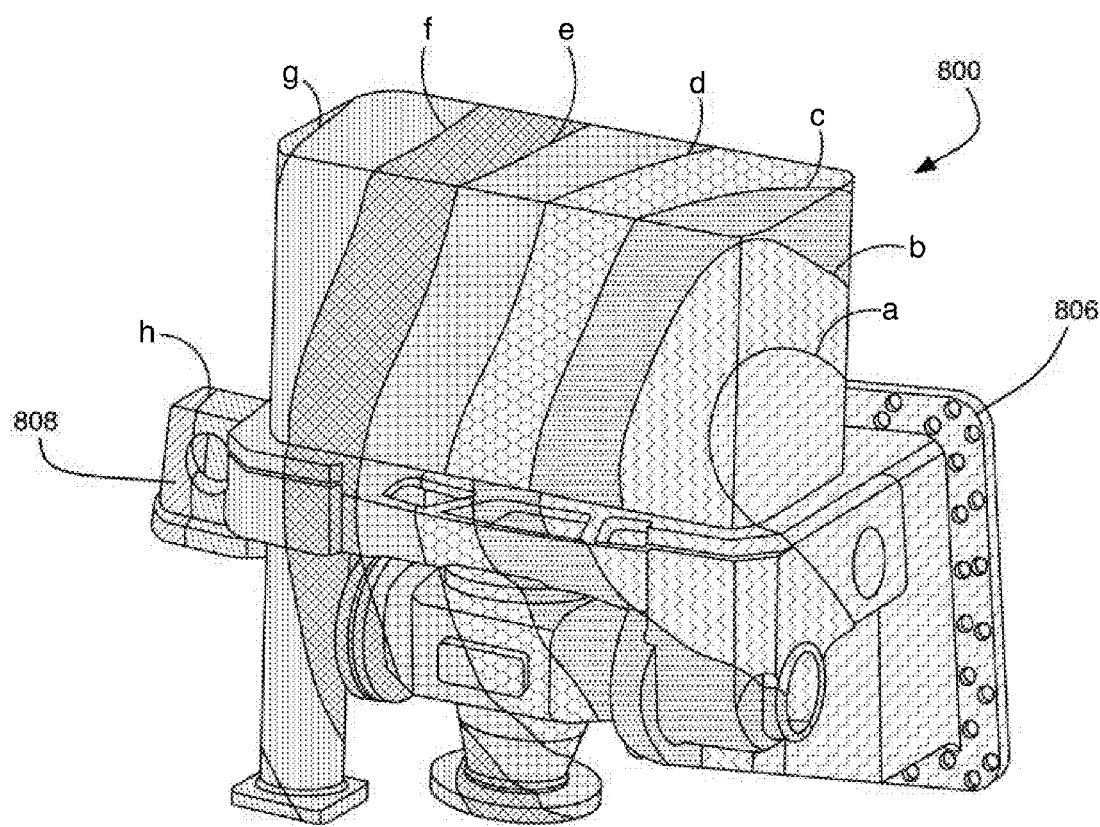
FIG. 8 illustrates in perspective contour view a vibration response of a prior art charge air cooler cover.
Figure 9:
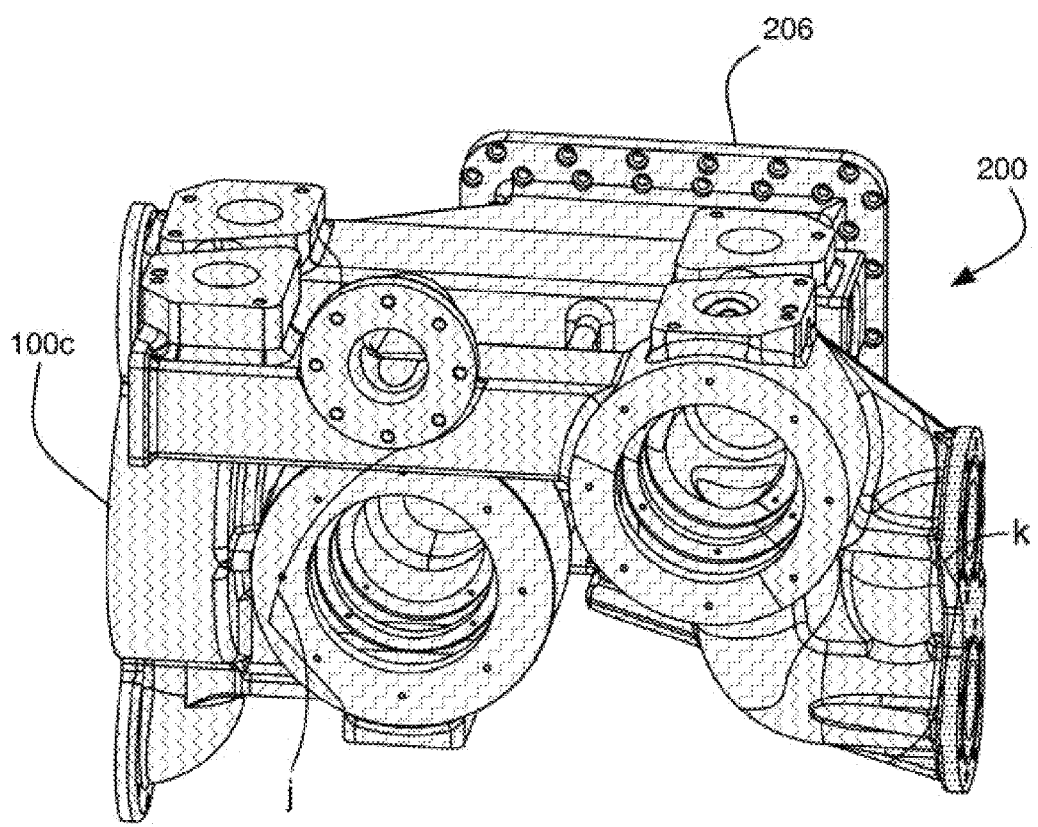
FIG. 9 illustrates in perspective contour view a vibration response of a charge air cooler cover as shown in FIGS. 5 and 6.

Referring to FIGS. 8 and 9, it is apparent that the integrated charge air cooler cover 200 as shown in FIG. 9, according to embodiments of the invention, substantially improves first-frequency vibration response compared to a prior art charge air cooler cover 800 as shown in FIG. 8. FIGS. 8 and 9 are marked with contour lines and variegated shading to indicate different ranges of vibrational displacement at different locations.

In FIG. 8, showing the prior art charge air cooler cover 800, the surfaces between flange 806 and contour line "a" displace by up to about 7.4 mm under a first mode vibration at a first forcing frequency less than standard engine running frequency; surfaces between contour lines "a" and "b" displace by up to about 14.8 mm; surfaces between contour lines "b" and "c" displace by up to about 22.2 mm; surfaces between contour lines "c" and "d" displace by up to about 29.6 mm; surfaces between contour lines "d" and "e" displace by up to about 37 mm; surfaces between contour lines "e" and "f" displace by up to about 44.4 mm; surfaces between contour lines "f" and "g" displace by up to about 51.8 mm; surfaces between contour lines "g" and "h" displace by up to about 59.2 mm; and surfaces to the left of contour line "h" displace by more than about 59.2 mm, all under the first mode of vibration.

By contrast, the contour lines of FIG. 9 show that under a first mode vibration at a second forcing frequency (nearly twice the first mode frequency of the conventional cooler cover), surfaces of the inventive cooler cover 200, between flange 206 and contour line "j," displace by no more than about 0.180 mm, while surfaces between contour line "j" and contour line "k" displace by no more than about 0.360 mm.

Thus, in embodiments, a cover is provided for a charge air cooler of a turbocharged engine. The cover comprises a body that defines a cooling water plenum, which has an opening at a first side of the cover for attachment over a water outlet of the charge air cooler. The cover also comprises a plurality of valve housings formed integrally with the body of the cover at a second side of the cover opposite the cooling water plenum opening. Each valve housing defines an inner chamber, which opens into an inner fluid passage formed in the cover. In certain embodiments, the peripheral wall of each valve housing protrudes from a surface of the cover, adjacent the opening of the respective inner chamber into the respective fluid passage, to an outward end that surrounds an outer chamber of the valve housing. The outward end of each peripheral wall is adapted for attachment of a respective bonnet plate, and each peripheral wall comprises an inward shoulder formed at its inner surface to partition the outer chamber from the inner chamber; the shoulder defines a window between the inner chamber and the outer chamber. In particular embodiments, a sectional area of the outer chamber is larger than a sectional area of the window, and the sectional area of the window is larger than the sectional area of the opening into the inner fluid passage, such that a bottom plate can be inserted through the outer chamber and the window for attachment at the opening from the inner chamber into the fluid passage, and such that an intermediate plate can be inserted through the outer chamber for attachment at the window. In certain embodiments, the cover may be provided with a plurality of different bottom plates, a plurality of different intermediate plates each corresponding to a respective one of the plurality of bottom plates, and a plurality of different bonnet plates each corresponding to respective ones of the plurality of different bottom plates and the plurality of different intermediate plates, each corresponding set of bottom, intermediate and bonnet plates comprising a different valve functionality. In certain embodiments, the peripheral wall of each valve housing may also comprise an intermediate fluid passage opening into the inner chamber, and a outer fluid passage opening into the outer chamber. In certain embodiments, the plurality of valve housings comprise a first valve housing at a first end of the cover and a second valve housing at an opposite end of the cover, and the cover also comprises a stiffener, which extends laterally across the second side of the cover from the peripheral wall of the first valve housing to the peripheral wall of the second valve housing, the stiffener being integrally attached to the peripheral walls of both valve housings. In particular embodiments, the second valve housing comprises an upper nozzle through which the intermediate fluid passage extends, and to which the stiffener is integrally attached. Also, there may be a fluid conduit formed within the stiffener with a first end opening through the peripheral wall of the first valve housing into the inner chamber of the first valve housing and with a second end opening adjacent to the second valve housing peripheral wall. In certain embodiments, the cover further comprises a third valve housing formed at a third side of the cover generally orthogonal to the first side and the second side, the third valve housing having a peripheral wall that defines an inner chamber opening into a outer fluid passage formed in the cover. This third valve housing may be integrally attached to the stiffener. For example, the third valve housing may have an upper nozzle that is attached to the stiffener by way of a bridge. Such a bridge may extend generally orthogonal to a central axis of the third valve housing and generally parallel to a central axis of the second valve housing. In certain embodiments, the plurality of valve housings includes at least a first valve housing and a second valve housing. The first valve housing has a first inner chamber which opens into a first inner fluid passage formed in the cover, and a first outer chamber which opens from the first inner chamber opposite the first inner fluid passage; the second valve housing has a second inner chamber which opens into a second inner fluid passage formed in the cover, and a second outer chamber which opens from the second inner chamber opposite the second inner fluid passage. At least when a first valve is operably disposed in the first valve housing, the first inner fluid passage is configured for fluid attachment to a lube oil filter of an engine, the first inner chamber is configured for fluid attachment to a lube oil cooler, and the first outer chamber is configured for fluid attachment to a lube oil pump discharge. At least when a second valve is operably disposed in the second valve housing, the second inner fluid passage is configured for fluid attachment to receive water from charge air cooler of the engine, the second inner chamber is configured for fluid attachment to deliver water to a cooler vessel, and the second outer chamber is configured for fluid attachment to deliver water back toward the engine. Further, when the first valve is operably disposed in the first valve housing, the first valve may be configured to proportion flow of oil from the first inner chamber and the first outer chamber to the first inner fluid passage; and when the second valve is operably disposed in the second valve housing, the second valve may be configured to proportion flow of water from the second inner fluid passage among the second inner chamber and the second outer chamber.

In other embodiments, a valve is installed in a charge air cooler cover. The thermostat valve comprises a bottom plate fastened into an inner chamber of a valve housing formed in the charge air cooler cover and partitioning the inner chamber of the valve housing from an inner fluid passage formed through the cooler cover, the bottom plate including a flow hole. The thermostat valve also comprises a thermostrictive element fixedly attached to the bottom plate at or adjacent the flow hole, with a first end of the thermostrictive element protruding from the bottom plate into the inner fluid passage and with a second end of the thermostrictive element projecting from the bottom plate into the inner chamber of the valve housing. The thermostat valve also comprises an intermediate plate fastened to an inward shoulder of the valve housing and partitioning the inner chamber of the valve housing from an outer chamber of the valve housing, and including an orifice aligned with the flow hole of the bottom plate; a sleeve positioned sealingly through the orifice of the intermediate plate, and supported on the second end of the thermostrictive element for movement with reference to the bottom plate; a bonnet plate sealing fastened to an outward surface of the valve housing and sealing the outer chamber of the valve housing; and a stopper projecting from the bonnet plate toward the bottom plate in alignment with the orifice of the intermediate plate. In certain embodiments, the thermostrictive element is configured such that within a first temperature range in the fluid passage an inward end of the sleeve contacts the bottom plate while an outward end of the sleeve is spaced apart from the stopper, such that fluid can pass from the inner fluid passage via the sleeve to the outer chamber, within a second temperature range in the fluid passage the inward end of the sleeve is spaced apart from the bottom plate and the outward end of the sleeve is spaced apart from the stopper, such that fluid can pass from the inner fluid passage to the inner chamber and via the sleeve to the outer chamber, and within a third temperature range in the fluid passage the inward end of the sleeve is spaced apart from the bottom plate and the outward end of the sleeve contacts the stopper, such that fluid can pass from the inner fluid passage to the inner chamber and is stopped from passing via the sleeve to the outer chamber. In certain embodiments, the sleeve is one of a plurality of sleeves and the stopper is one of a plurality of stoppers, each sleeve aligned with a corresponding stopper, the bottom plate and the intermediate plate each having a plurality of holes each aligned with corresponding ones of the pluralities of sleeves and stoppers. In particular embodiments, the thermostat element is one of a plurality of thermostat elements, each thermostat element movably connecting a corresponding sleeve to the bottom plate.

In other embodiments, a mixing valve is assembled into a charge air cooler cover. The mixing valve comprises a bottom plate fastened into an inner chamber of a valve housing integrally formed in the body of the cooler cover, and partitioning the inner chamber of the valve housing from an inner fluid passage formed in the cooler cover, the bottom plate including a flow hole. The mixing valve also comprises an intermediate plate fastened into the valve housing and partitioning the inner chamber of the valve housing from an outer chamber of the valve housing, and including an orifice aligned with the flow hole of the bottom plate; a bonnet plate fastened at an outward surface of the valve housing and sealing the outer chamber of the valve housing; a stopper projecting from the bonnet plate toward the bottom plate in alignment with the orifice of the intermediate plate; and a sleeve supported for movement sealingly through the orifice of the intermediate plate between first, second, and third conditions of the sleeve. Under the first condition an inward end of the sleeve contacts the bottom plate sealingly around the flow hole, while an outward end of the sleeve is spaced apart from the stopper, such that fluid can pass among the inner fluid passage and the outer chamber via the sleeve, under the second condition the inward end of the sleeve is spaced apart from the bottom plate and the outward end of the sleeve is spaced apart from the stopper, such that fluid can pass among the inner fluid, the inner chamber, and the outer chamber via the sleeve, and under the third condition the inward end of the sleeve is spaced apart from the bottom plate and the outward end of the sleeve contacts the stopper, such that fluid can pass among the inner fluid passage and the inner chamber via the sleeve and is stopped from passing to or from the outer chamber. In certain embodiments, the sleeve is one of a plurality of sleeves and the stopper is one of a plurality of stoppers, each sleeve aligned with a corresponding stopper, the bottom plate and the intermediate plate having a plurality of holes each aligned with corresponding ones of the pluralities of sleeves and stoppers. In certain embodiments, the sleeve is supported for movement by a thermostrictive element fastened to the bottom plate. In particular embodiments, the thermostrictive element extends through the flow hole.

References to "water" as used herein refer to engine coolants more generally, which may be water, a mixture of water and ethylene glycol (i.e., "antifreeze"), or the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice embodiments of the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal language of the claims.

As used herein, an element or step recited in the singular and proceeded with the word "a" or "an" should be understood as not excluding plural of the elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described charge air cooler cover and thermostat valve, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A cover for a charge air cooler of an engine, said cover comprising:
    a body defining a cooling water plenum, which has an opening at a first side of the cover for attachment to the charge air cooler; and
    a plurality of valve housings formed integrally with the body of the cover at a second side of the cover opposite the cooling water plenum opening, each valve housing defining a respective inner chamber, which opens into a respective inner fluid passage formed in the cover for the passage of at least one of liquid lubricant or liquid coolant.

2. The cover as claimed in claim 1, wherein a peripheral wall of each valve housing protrudes from a surface of the body, adjacent the opening of the respective inner chamber into the respective fluid passage, to an outward end that surrounds an outer chamber of the valve housing,
    the outward end of each peripheral wall being adapted for attachment of a respective bonnet plate, the peripheral wall including an inward shoulder formed at its inner surface to partition the outer chamber from the inner chamber, the shoulder defining a window between the inner chamber and the outer chamber.

3. The cover as claimed in claim 2, wherein a sectional area of the outer chamber is larger than a sectional area of the window, and the sectional area of the window is larger than the sectional area of the opening into the inner fluid passage, such that a bottom plate can be inserted through the outer chamber and the window for attachment at the opening from the inner chamber into the fluid passage, and such that an intermediate plate can be inserted through the outer chamber for attachment at the window.

4. The cover as claimed in claim 3, further comprising:
    a plurality of different bottom plates;
    a plurality of different intermediate plates each corresponding to a respective one of the plurality of bottom plates; and
    a plurality of different bonnet plates each corresponding to respective ones of the plurality of different bottom plates and the plurality of different intermediate plates,
    each corresponding set of bottom, intermediate and bonnet plates comprising a different valve functionality.

5. The cover as claimed in claim 2, wherein the peripheral wall of each valve housing comprises a respective intermediate fluid passage opening into the inner chamber, and an outer fluid passage opening into the outer chamber.

6. The cover as claimed in claim 1, wherein the plurality of valve housings comprise a first valve housing at a first end of the cover and a second valve housing at an opposite end of the cover, further comprising:
    a stiffener, which extends laterally across the second side of the cover from a peripheral wall of the first valve housing to a peripheral wall of the second valve housing, the stiffener being integrally attached to the peripheral walls of both valve housings.

7. The cover as claimed in claim 6, wherein the second valve housing comprises an upper nozzle through which an intermediate fluid passage extends, and to which the stiffener is integrally attached.

8. The cover as claimed in claim 6, further comprising a fluid conduit formed within the stiffener with a first end opening through the peripheral wall of the first valve housing into the inner chamber of the first valve housing and with a second end opening adjacent to the second valve housing peripheral wall.

9. The cover as claimed in claim 6, further comprising a third valve housing formed at a third side of the cover generally orthogonal to the first side and the second side, the third valve housing having a peripheral wall that defines an inner chamber opening into a outer fluid passage formed in the cover.

10. The cover as claimed in claim 9, the third valve housing being integrally attached to the stiffener.

11. The cover as claimed in claim 10, the third valve housing having an upper nozzle that is attached to the stiffener by way of a bridge.

12. The cover as claimed in claim 11, the bridge extending generally orthogonal to a central axis of the third valve housing and generally parallel to a central axis of the second valve housing.

13. The cover as claimed in claim 1, wherein the plurality of valve housings comprises at least a first valve housing and a second valve housing,
    the first valve housing having a first inner chamber which opens into a first inner fluid passage formed in the cover, and a first outer chamber which opens from the first inner chamber opposite the first inner fluid passage,
    the second valve housing having a second inner chamber which opens into a second inner fluid passage formed in the cover, and a second outer chamber which opens from the second inner chamber opposite the second inner fluid passage,
    wherein, at least when a first valve is operably disposed in the first valve housing, the first inner fluid passage is configured for fluid attachment to a lube oil filter of an engine, the first inner chamber is configured for fluid attachment to a lube oil cooler, and the first outer chamber is configured for fluid attachment to a lube oil pump discharge,
    wherein, at least when a second valve is operably disposed in the second valve housing, the second inner fluid passage is configured for fluid attachment to receive water from charge air cooler of the engine, the second inner chamber is configured for fluid attachment to deliver water to a cooler vessel, and the second outer chamber is configured for fluid attachment to deliver water back toward the engine.

14. The cover as claimed in claim 13, further comprising: the first valve operably disposed in the first valve housing, wherein the first valve is configured to proportion flow of oil from the first inner chamber and the first outer chamber to the first inner fluid passage; and the second valve operably disposed in the second valve housing, wherein the second valve is configured to proportion flow of water from the second inner fluid passage among the second inner chamber and the second outer chamber.

15. A valve installed in a charge air cooler cover, the valve comprising:
- a bottom plate fastened into an inner chamber of a valve housing formed in the charge air cooler cover and partitioning the inner chamber of the valve housing from an inner fluid passage formed through the cooler cover, the bottom plate including a flow hole;
- a thermostrictive element fixedly attached to the bottom plate at or adjacent the flow hole, with a first end of the thermostrictive element protruding from the bottom plate into the inner fluid passage and with a second end of the thermostrictive element projecting from the bottom plate into the inner chamber of the valve housing;
- an intermediate plate fastened to an inward shoulder of the valve housing and partitioning the inner chamber of the valve housing from an outer chamber of the valve housing, and including an orifice aligned with the flow hole of the bottom plate;
- a sleeve positioned sealingly through the orifice of the intermediate plate, and supported on the second end of the thermostrictive element for movement with reference to the bottom plate;
- a bonnet plate sealing fastened to an outward surface of the valve housing and sealing the outer chamber of the valve housing; and
- a stopper projecting from the bonnet plate toward the bottom plate in alignment with the orifice of the intermediate plate.

16. The valve as claimed in claim 15, wherein the thermostrictive element is configured such that within a first temperature range in the inner fluid passage an inward end of the sleeve contacts the bottom plate while an outward end of the sleeve is spaced apart from the stopper, such that fluid can pass from the inner fluid passage via the sleeve to the outer chamber, within a second temperature range in the inner fluid passage the inward end of the sleeve is spaced apart from the bottom plate and the outward end of the sleeve is spaced apart from the stopper, such that fluid can pass from the inner fluid passage to the inner chamber and via the sleeve to the outer chamber, and within a third temperature range in the inner fluid passage the inward end of the sleeve is spaced apart from the bottom plate and the outward end of the sleeve contacts the stopper, such that fluid can pass from the inner fluid passage to the inner chamber and is stopped from passing via the sleeve to the outer chamber.

17. The valve as claimed in claim 15, wherein the sleeve is one of a plurality of sleeves and the stopper is one of a plurality of stoppers, each sleeve aligned with a corresponding stopper, the bottom plate and the intermediate plate each having a plurality of holes each aligned with corresponding ones of the pluralities of sleeves and stoppers.

18. The valve as claimed in claim 17, wherein the thermostat element is one of a plurality of thermostat elements, each thermostat element movably connecting a corresponding sleeve to the bottom plate.

19. A mixing valve assembled into a charge air cooler cover, the mixing valve comprising:
- a bottom plate fastened into an inner chamber of a valve housing integrally formed in a body of the cooler cover, and partitioning the inner chamber of the valve housing from an inner fluid passage formed in the cooler cover, the bottom plate including a flow hole;
- an intermediate plate fastened into the valve housing and partitioning the inner chamber of the valve housing from an outer chamber of the valve housing, and including an orifice aligned with the flow hole of the bottom plate;
- a bonnet plate fastened at an outward surface of the valve housing and sealing the outer chamber of the valve housing;
- a stopper projecting from the bonnet plate toward the bottom plate in alignment with the orifice of the intermediate plate; and
- a sleeve supported for movement sealingly through the orifice of the intermediate plate between first, second, and third conditions of the sleeve,
wherein under the first condition an inward end of the sleeve contacts the bottom plate sealingly around the flow hole, while an outward end of the sleeve is spaced apart from the stopper, such that fluid can pass among the inner fluid passage and the outer chamber via the sleeve, under the second condition the inward end of the sleeve is spaced apart from the bottom plate and the outward end of the sleeve is spaced apart from the stopper, such that fluid can pass among the inner fluid passage, the inner chamber, and the outer chamber via the sleeve, and under the third condition the inward end of the sleeve is spaced apart from the bottom plate and the outward end of the sleeve contacts the stopper, such that fluid can pass among the inner fluid passage and the inner chamber via the sleeve and is stopped from passing to or from the outer chamber.

20. The mixing valve as claimed in claim 19, wherein the sleeve is one of a plurality of sleeves and the stopper is one of a plurality of stoppers, each sleeve aligned with a corresponding stopper, the bottom plate and the intermediate plate having a plurality of holes each aligned with corresponding ones of the pluralities of sleeves and stoppers.

21. The mixing valve as claimed in claim 19, wherein the sleeve is supported for movement by a thermostrictive element fastened to the bottom plate.

22. The mixing valve as claimed in claim 21, wherein the thermostrictive element extends through the flow hole.

* * * * *